(12) United States Patent
Caveney

(10) Patent No.: US 7,565,211 B2
(45) Date of Patent: Jul. 21, 2009

(54) ETHERNET-TO-ANALOG CONTROLLER

(75) Inventor: Jack E. Caveney, Hinsdale, IL (US)

(73) Assignee: Panduit Corp., Tinley Park, IL (US)

(*) Notice: Subject to any disclaimer, the term of this patent is extended or adjusted under 35 U.S.C. 154(b) by 413 days.

(21) Appl. No.: 11/283,573

(22) Filed: Nov. 18, 2005

(65) Prior Publication Data

US 2006/0165097 A1   Jul. 27, 2006

Related U.S. Application Data

(60) Provisional application No. 60/628,919, filed on Nov. 18, 2004.

(51) Int. Cl.
  *G05B 15/00* (2006.01)
  *G06F 1/00* (2006.01)
(52) U.S. Cl. .............. 700/75; 700/79; 700/82; 713/300
(58) Field of Classification Search .......... 700/75, 700/286, 21, 264, 79, 82; 370/311, 395.53; 713/340, 300
See application file for complete search history.

(56) References Cited

U.S. PATENT DOCUMENTS

| | | |
|---|---|---|
| 3,959,772 A | 5/1976 | Wakasa et al. |
| 4,535,401 A | 8/1985 | Penn |
| 4,633,217 A | 12/1986 | Akano |
| 4,806,905 A | 2/1989 | McGowan, III et al. |
| 4,918,690 A | 4/1990 | Markkula, Jr. et al. |
| 4,926,158 A | 5/1990 | Zeigler |
| 5,089,927 A | 2/1992 | Bulan et al. |
| 5,089,974 A | 2/1992 | Demeyer et al. |
| 5,451,923 A | 9/1995 | Seberger et al. |
| 5,469,150 A | 11/1995 | Sitte |
| 5,530,377 A | 6/1996 | Walls |
| 5,581,478 A | 12/1996 | Cruse et al. |
| 5,635,896 A | 6/1997 | Tinsley et al. |
| 5,793,646 A | 8/1998 | Hibberd et al. |
| 5,796,965 A | 8/1998 | Choi et al. |

(Continued)

FOREIGN PATENT DOCUMENTS

EP   0 660 287 A1   6/1995

(Continued)

OTHER PUBLICATIONS

Beckhoff—New Automation Technology—Building Automation Brochure.

(Continued)

*Primary Examiner*—Paul L Rodriguez
*Assistant Examiner*—Sheela Rao
(74) *Attorney, Agent, or Firm*—Robert A. McCann; Zachary J. Smolinski

(57) ABSTRACT

Systems and methods allow communication between an Ethernet network and non-Ethernet devices. An Ethernet-to-analog adapter allows translation of analog signals for Ethernet communication, and further allows translation of Ethernet signals for analog communication with analog devices. Ethernet-to-analog adapters allow for power management and monitoring of attached analog devices and employ Power over Ethernet (PoE) to supply power to analog devices. A rechargeable battery may be provided to satisfy the peak power requirements of an attached analog device.

12 Claims, 3 Drawing Sheets

U.S. PATENT DOCUMENTS

| | | | |
|---|---|---|---|
| 5,841,360 A | 11/1998 | Binder | |
| 5,909,586 A | 6/1999 | Anderson | |
| 5,994,998 A | 11/1999 | Fisher et al. | |
| 6,049,578 A | 4/2000 | Senechal et al. | |
| 6,055,633 A | 4/2000 | Schrier et al. | |
| 6,097,761 A | 8/2000 | Buhring et al. | |
| 6,108,300 A * | 8/2000 | Coile et al. | 370/217 |
| 6,115,468 A | 9/2000 | De Nicolo | |
| 6,125,448 A | 9/2000 | Schwan et al. | |
| 6,140,911 A | 10/2000 | Fisher et al. | |
| 6,141,763 A | 10/2000 | Smith et al. | |
| 6,175,556 B1 | 1/2001 | Allen, Jr. et al. | |
| 6,218,930 B1 | 4/2001 | Katzenberg et al. | |
| 6,246,748 B1 | 6/2001 | Yano | |
| 6,295,356 B1 | 9/2001 | De Nicolo | |
| 6,348,874 B1 | 2/2002 | Cole et al. | |
| 6,393,050 B1 | 5/2002 | Liu | |
| 6,487,214 B1 | 11/2002 | Bachar | |
| 6,640,308 B1 | 10/2003 | Keyghobad et al. | |
| 6,643,566 B1 * | 11/2003 | Lehr et al. | 700/286 |
| 6,714,977 B1 | 3/2004 | Fowler et al. | |
| 6,832,120 B1 | 12/2004 | Frank et al. | |
| 6,888,459 B2 * | 5/2005 | Stilp | 340/541 |
| 2004/0025066 A1 | 2/2004 | Jackson et al. | |
| 2004/0073597 A1 | 4/2004 | Caveney et al. | |
| 2004/0090984 A1 | 5/2004 | Saint-Hilaire et al. | |
| 2004/0136384 A1 | 7/2004 | Cho | |
| 2004/0160897 A1 | 8/2004 | Fowler et al. | |
| 2004/0163102 A1 | 8/2004 | Fowler et al. | |
| 2004/0164619 A1 | 8/2004 | Parker et al. | |
| 2004/0230846 A1 | 11/2004 | Mancey et al. | |

FOREIGN PATENT DOCUMENTS

| | | |
|---|---|---|
| EP | 1 096 724 A1 | 5/1999 |
| WO | WO 96/23377 | 8/1996 |
| WO | WO 98/20649 | 5/1998 |
| WO | WO 98/36518 | 8/1998 |
| WO | WO 98/54843 | 12/1998 |
| WO | WO 03/067392 A3 | 8/2003 |

OTHER PUBLICATIONS

Dec. 2005 Issue of IEN—Industrial Equipment News (Integrating & Automating): Collaborative Sys.

* cited by examiner

ETHERNET-TO-ANALOG CONTROLLER

CROSS-REFERENCE TO RELATED APPLICATION

This application claims the benefit of U.S. Provisional Application No. 60/628,919, filed Nov. 18, 2004 and entitled "Ethernet to Analog Controller."

BACKGROUND OF THE INVENTION

Analog devices, such as building automation system (BAS) devices, are commonly employed in buildings to enhance building operations. These devices include security and safety devices such as smoke detectors, fire alarms, security cameras, motion detectors, and emergency lighting. HVAC components, such as temperature sensors, are often analog devices. These devices can interface with a centralized controller using analog signaling. The centralized controller allows an operator to access and control these devices at a centralized location. For example, if a smoke detector senses smoke, the centralized controller can notify an operator of the detection signal and the location of the sensor. In this example, the centralized controller may perform other functions, such as activating a fire alarm or notifying the fire department.

While these systems are widely deployed and have proven useful, there is room for improvement of these systems and their components. For example, distributed components of BASs often require their own power supplies. This requires a local battery or a dedicated power line, or both, increasing the costs of installation and maintenance of such systems. Further, different BASs do not necessarily have the capability of communicating with each other or of being truly centrally controlled. For example, a BAS for HVAC may have its own centralized controller that is different from the controller for a fire-life-safety BAS. This increases the total cost of hardware and makes it more difficult to monitor and control all BAS components from a centralized location. There is a need for systems and methods that improve the operability and management of distributed analog devices such as BAS devices.

SUMMARY OF THE INVENTION

According to one embodiment of the present invention, an improved system for supplying power to analog components is provided.

According to some embodiments of the present invention, controllers are provided for accepting analog signals from analog devices and converting the analog signals for digital communication using Ethernet. The controllers may also convert Ethernet communications into analog signals that are sent to the analog devices.

Provision and management of power to analog devices may be improved by charging and monitoring a rechargeable battery of a controller or an analog device. The controller can notify a centralized system of any problem with the analog device or battery.

A controller according to the present invention can report the location of the controller and analog devices attached to the controller. Controllers can also turn the analog devices on and off as directed by a centralized system such as a network management system (NMS).

DETAILED DESCRIPTION OF THE ILLUSTRATED EMBODIMENTS

Figure 1:
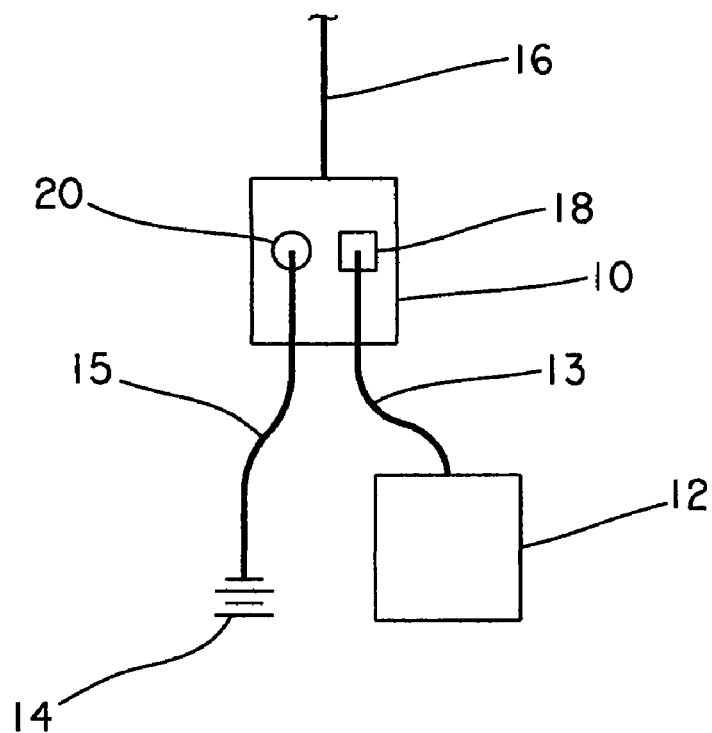
FIG. 1 is a block diagram of an Ethernet-to-analog controller deployment according to one embodiment of the present invention.

FIG. 1 shows an Ethernet-to-analog controller 10 connected to an analog device 12 with an analog device cable 13 and to a rechargeable battery 14 with a battery cable 15. The Ethernet-to-analog controller 10 is connected to an Ethernet network via a network cable 16. The network cable 16 may be an Ethernet cable providing Ethernet transmissions and Power Over Ethernet (PoE). For example, power may be supplied over the cable 16 via the IEEE 802.3af PoE standard.

An analog device 12 for use with embodiments of the present invention may be any non-Ethernet device. Further, while devices employing analog signaling are generally discussed, it is to be understood that embodiments of the present invention can be used for connection to devices that use non-Ethernet digital signaling. Attached devices may include, for example, security and safety devices such as smoke detectors, fire alarms, security cameras, motion detectors, door access mechanisms, badge readers, biometric sensors, and emergency lighting. HVAC components, such as temperature sensors, may also be used with the present invention. Other industrial devices, such as machine controllers and RFID readers, may also be employed.

The Ethernet-to-analog controller 10 is adapted to communicate with a centralized system such as a network management system (NMS). Though an NMS will be referred to throughout this description, it is to be understood that any centralized system, such as centralized controller software, may be substituted for an NMS in some embodiments of the present invention.

The analog device 12 is connected to the Ethernet-to-analog controller 10 with an analog device connector 18, and the rechargeable battery 14 is connected to the Ethernet-to-analog controller 10 with a battery connector 20. Different and/or polarized connectors may be used for the analog device 12 and the rechargeable battery 14.

According to one embodiment of the present invention, the Ethernet-to-analog controller 10 is capable of the following functions:

Reporting its physical location and the location of the analog device 12 to an NMS Turning the analog device 12 on and off as directed by an NMS Monitoring the analog device 12 and the rechargeable battery 14 to ensure that they are operational Advising an NMS of any problem with the analog device 12 or the rechargeable battery 14

Charging the rechargeable battery 14 using a trickle current, with power coming from Power over Ethernet Receiving signals from the analog device 12, converting the signals for Ethernet communication, and transmitting the signals to an NMS Receiving Ethernet communications from an NMS, converting the signals to analog signals, and transmitting the analog signals to the analog device 12.

According to one embodiment, the rechargeable battery 14 provides power for the analog device 12 when the peak power requirement of the analog device 12 exceeds the power available from PoE. For example, if the analog device 12 is a fire alarm, the rechargeable battery 14 may be used to provide power to sound the alarm if PoE is not sufficient to power the alarm. When the alarm is not being sounded, the rechargeable battery 14 is recharged by the Ethernet-to-analog controller 10. The rechargeable battery 14 may be provided within the Ethernet-to-analog controller 10, or it may be external to the Ethernet-to-analog controller 10. If PoE meets the full power requirements of the analog device 12, the rechargeable battery 14 may be eliminated.

According to one embodiment of the present invention, the Ethernet-to-analog converter 10 comprises the following elements:

An Ethernet digital-to-analog/analog-to-digital converter

An Ethernet endpoint (a "PHY") with a processor, capable of terminating SNMP and TCP/IP PoE components capable of being sensed as a powered device (PD) and of accepting PoE Power components for converting PoE to the power requirements of an attached analog device and for providing a trickle current to the rechargeable battery 14 when necessary.

Figure 2:
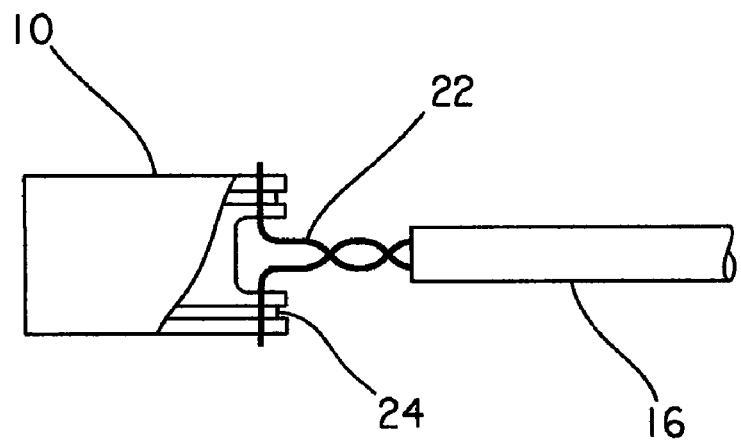
FIG. 2 is a side plan view of a connection of an Ethernet-to-analog controller to an Ethernet cable.

Turning now to FIG. 2, a side view of an Ethernet-to-analog controller 10 connected to a network cable 16 is shown. In the embodiment of FIG. 2, the network cable 16 is a horizontal Ethernet cable providing Ethernet transmission and PoE. Wires 22 of the Ethernet cable are terminated at punch-down terminations 24 of the Ethernet-to-analog controller 10.

Figure 3:
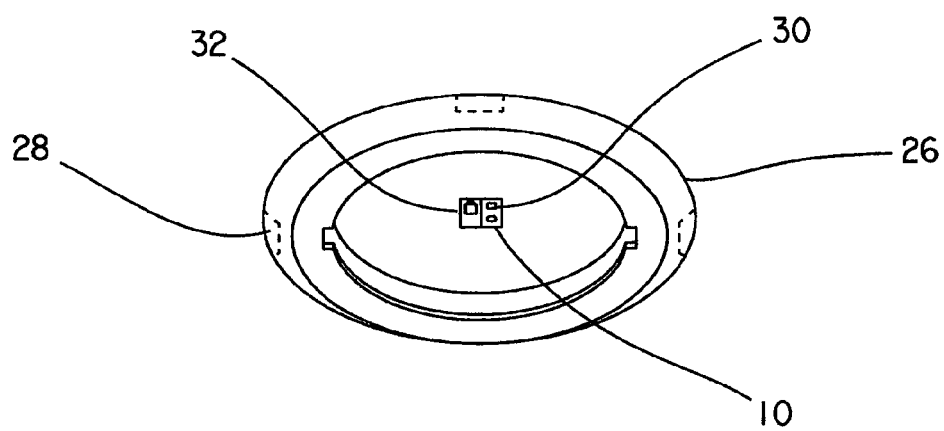
FIG. 3 is a bottom perspective view of an Ethernet-to-analog controller in a ceiling-mount adapter.
Figure 3A:
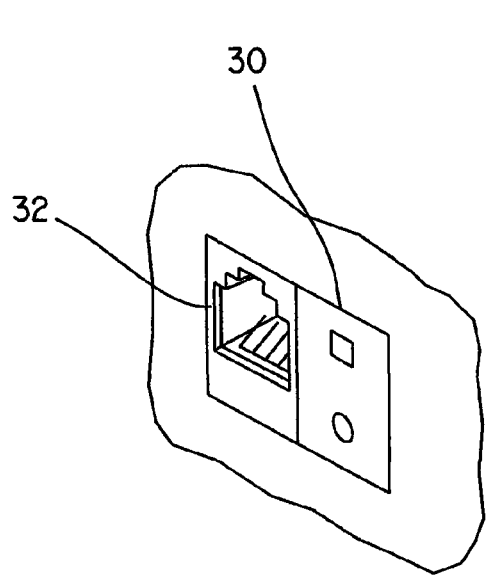
FIG. 3a is a perspective detail view of connection jacks according to one embodiment of the present invention.
Figure 3B:
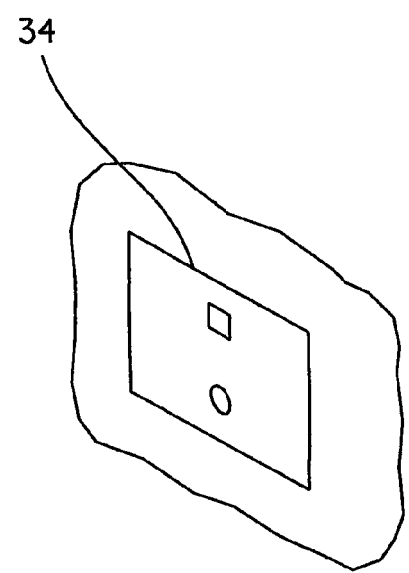
FIG. 3b is a perspective detail view of connection jacks according to another embodiment of the present invention.

FIG. 3 shows an Ethernet-to-analog controller 30 along with an RJ-45 jack 32 in a ceiling adapter 26. The ceiling adapter includes optional knockouts 28 for surface raceways. Ethernet-to-analog controllers according to the present invention may be provided in different configurations for different applications. For example, FIGS. 3a and 3b are detail views of two different configurations for Ethernet-to-analog controllers that may be used with two modular openings in an adapter such as the ceiling adapter 26. FIG. 3a shows an Ethernet-to-analog controller 30 for use with a single modular opening. The second of the two modular openings is an extra module space and may be reserved for another type of jack such as an RJ-45 jack 32. FIG. 3b shows an Ethernet-to-analog controller 34 designed to occupy two modular openings.

Figure 4:
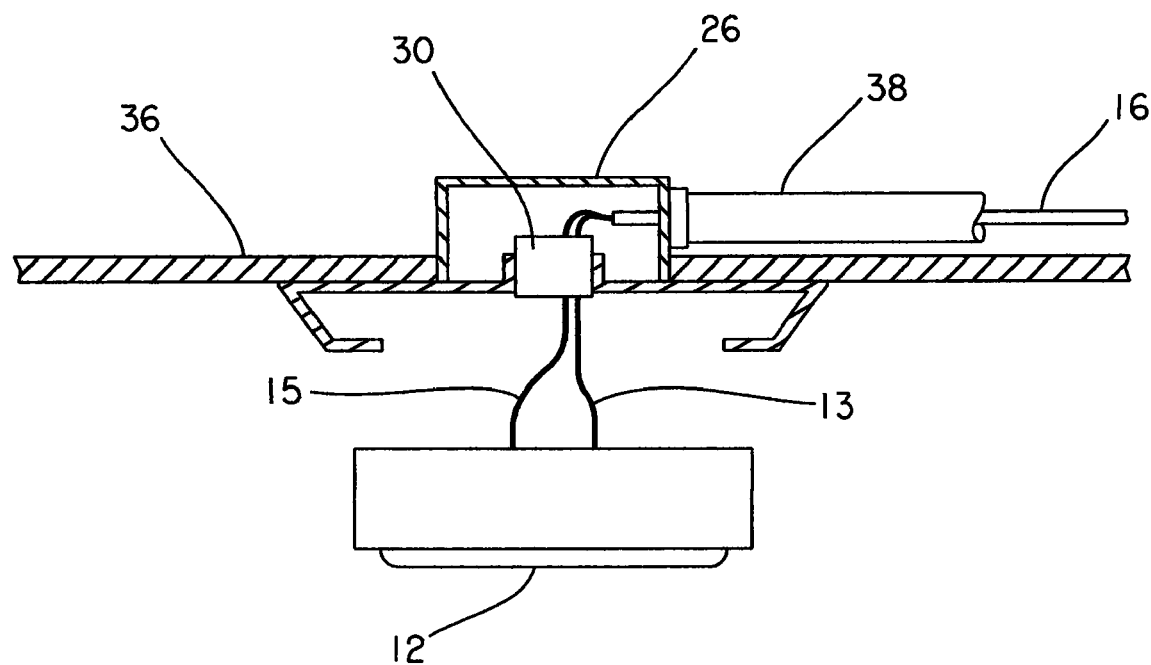
FIG. 4 is a cutaway side view of an Ethernet-to-analog controller installation.
Figure 5:
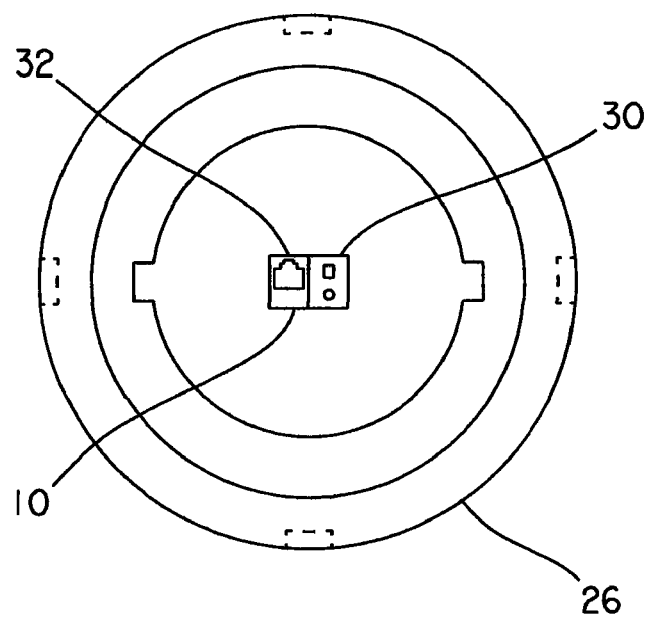
FIG. 5 is a bottom view of a ceiling-mounted Ethernet-to-analog controller.

FIG. 4 is a side cutaway view of an Ethernet-to-analog controller 30 with a ceiling adapter 26 mounted in a ceiling 36. An analog device cable 13 and a battery cable 15 provide connection between the Ethernet-to-analog controller 30 and the analog device 12, which may be a BAS device. The Ethernet-to-analog controller 30 is connected to an NMS via a network cable 16, which is provided within a length of conduit 38. FIG. 5 shows a bottom view of an Ethernet-to-analog controller 30 and RJ-45 jack 32 with a ceiling adapter 26. While a ceiling adapter is illustrated in FIGS. 3-5, a wall-mount fixture having similar features may also be provided.

According to one embodiment of the present invention, an Ethernet-to-analog controller is a BAS device with a standard Ethernet interface. The standard Ethernet interface is an active network device (AND) which incorporates a MAC ID chip and which receives PoE. Detection of PoE usage detects any problem with the network connection to the AND. The AND can initiate an alarm signal on the network which is triggered by a problem detection circuit in the BAS device. The device may be provided with a test mode which is initiated by a query, and its response may include the AND ID. PoE detection recognizes either of the following as normal: a) power for the AND plus variable power to trickle-charge a local battery; or b) power for the AND plus relatively constant power for a BAS device. If the BAS device (e.g., a door unlock or a light signal) requires a surge of power, the power is supplied by a local battery through a switch which is operated by the AND. If the BAS device is a sensor such as a smoke detector, the relatively constant power for the detector is provided directly by PoE. The detector alarm signal is converted to an Ethernet signal and transmitted by the AND. In this and other embodiments, the Ethernet system is standard and the central system (e.g., the NMS) is digital.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An Ethernet-to-analog system comprising:
an Ethernet-to-analog controller having an Ethernet connection port, an analog device connector, and a battery connector;
an analog device connected to said analog device connector; and
a rechargeable battery connected to said battery connector;
wherein said Ethernet-to-analog controller receives power via said Ethernet connection port and further routes power from at least one of said Ethernet connection port and said rechargeable battery to said analog device, said Ethernet-to-analog controller comprises a power component that provides normal operating power to said analog device from said Ethernet connection port and that routes power from said rechargeable battery to said analog device when power from said Ethernet connection port is insufficient to power said analog device and there is an increase in power consumption by said analog device, and said Ethernet-to-analog controller comprises a digital-to-analog and analog-to-digital converter that provides data connectivity between said Ethernet connection port and said analog device connector.

2. The Ethernet-to-analog system of claim 1 wherein said analog device is selected from the group consisting of a smoke detector, a fire alarm, a security camera, a motion detector, a door access mechanism, a badge reader, a biometric sensor, emergency lighting, a temperature sensor, a machine controller, and an radio frequency identification reader.

3. The Ethernet-to-analog system of claim 1 wherein said Ethernet-to-analog controller comprises a power-over-Ethernet component that is capable of being detected as a powered device and that is further capable of accepting power-over-Ethernet according to the IEEE 802.3af power-over-Ethernet standard.

4. The Ethernet-to-analog system of claim 1 wherein said Ethernet-to-analog controller comprises a power component that converts said power received from said Ethernet connection port to power requirements of said analog device and that further provides a trickle current to said rechargeable battery.

5. The Ethernet-to-analog system of claim 1 wherein said rechargeable battery is contained within the same housing as the Ethernet-to-analog controller.

6. An Ethernet-to-analog controller comprising:
- an Ethernet connector;
- an Ethernet-compatible digital-to-analog and analog-to-digital converter;
- an Ethernet interface with a processor, said Ethernet interface capable of communicating with network components via Simple Network Management Protocol and Transmission Control Protocol/Internet Protocol;
- power-over-Ethernet components capable of being detected as a powered device and further capable of accepting power-over-Ethernet according to the IEEE 802.3af power-over-Ethernet standard;
- a battery connector;
- an analog device connector for connecting said Ethernet-to-analog controller to an analog device; and
- power components for converting power-over-Ethernet to alternative power requirements of analog devices and further for providing a trickle current capable of recharging a battery connected to said battery connector, and wherein said power components are capable of routing power from said battery to said analog device when power from said power-over-Ethernet is insufficient and is due to an increase in power consumption by said analog device.

7. The Ethernet-to-analog controller of claim 6 wherein said Ethernet-to-analog controller is mounted in a ceiling via a ceiling adapter.

8. The Ethernet-to-analog controller of claim 6 further comprising a rechargeable battery connected to said battery connector.

9. The Ethernet-to-analog controller of claim 6 wherein said analog-to-digital converter converts analog signals of an attached analog device to digital signals for communication to a network via said Ethernet connection.

10. The Ethernet-to-analog controller of claim 6 wherein said digital-to-analog converter converts digital signals from said Ethernet connection to analog signals for communication to an analog device via said analog device connector.

11. The Ethernet-to-analog controller of claim 6 wherein said processor is adapted to report the physical location of the Ethernet-to-analog controller in response to a request from a network management system via said Ethernet connector.

12. The Ethernet-to-analog controller of claim 6 wherein said Ethernet interface comprises an active network device having a Media Access Control ID chip.

* * * * *